United States Patent

Chang et al.

[11] Patent Number: 5,746,913
[45] Date of Patent: May 5, 1998

[54] CONTINUOUS SAND FILTER

[76] Inventors: Hsiu-Chuan Chang, 31, Chien-kuo Rd., Chung-shan Lee, Chu-shan Township, NanTou Hsien; Mao-Sheng Lin, 4, Tai-lin Lane, Tien-tzu Lee, Chu-shan Township, NAn Tou Hsien, both of Taiwan

[21] Appl. No.: 795,642

[22] Filed: Feb. 6, 1997

[30] Foreign Application Priority Data

May 23, 1996 [TW] Taiwan ................... 85207694

[51] Int. Cl.$^6$ .................................................. B01D 24/46
[52] U.S. Cl. .................. 210/189; 210/268; 210/274; 210/221; 210/2
[58] Field of Search ................... 210/189, 221.2, 210/266, 268, 274, 295, 197

[56] References Cited

U.S. PATENT DOCUMENTS

| | | | |
|---|---|---|---|
| 4,060,484 | 11/1977 | Austin et al. | 210/268 |
| 4,197,201 | 4/1980 | Hjelmner et al. | 210/189 |
| 4,720,347 | 1/1988 | Berne | 210/189 |
| 4,891,142 | 1/1990 | Hering, Jr. | 210/189 |
| 5,011,597 | 4/1991 | Canzoneri et al. | 210/221.2 |
| 5,173,194 | 12/1992 | Hering, Jr. | 210/189 |
| 5,277,829 | 1/1994 | Ward | 210/274 |
| 5,392,924 | 2/1995 | Hume | 210/221.2 |
| 5,454,959 | 10/1995 | Stevens | 210/268 |
| 5,543,037 | 8/1996 | Hering, Jr. | 210/189 |

*Primary Examiner*—Neil McCarthy
*Assistant Examiner*—Theodore M. Green
*Attorney, Agent, or Firm*—Bacon & Thomas

[57] ABSTRACT

A continuous sand filter has a tank provided therein with a first separation container and a second separation container. The continuous filtration of the waste water is carried out in the first separation container and the second separation container. The first separation container is provided with an arresting piece capable of enhancing the filtration effect. The light and the heavy impurities are treated separately in the first separation container. The further filtration process is carried out continuously in the second separation container.

1 Claim, 4 Drawing Sheets

CONTINUOUS SAND FILTER

FIELD OF THE INVENTION

The present invention relates generally to a waste water treatment, and more particularly to a continuous sand filter intended for use in the waste water treatment.

BACKGROUND OF THE INVENTION

The waste water treatment is generally composed of a waste water collection tank, a precipitation tank, and a sand filter for separating the impurities from the water.

As illustrated in FIG. 1, a conventional sand filter is mainly composed of a filtration tank, which is mounted on a plurality of support legs. The filtration tank is gradually tapered in shape towards the bottom end thereof and is provided therein with a predetermined amount of filtration sand into which the waste water is injected through a water-admitting pipe. The impurities form a layer on the surface of water. The filtration sand containing the impurities is pumped by an air compressor into a separation tank located at the top of the sand filter.

Such a prior art sand filter as described above is defective in design in that it is incapable of removing the impurities, especially those impurities heavier than the water, from the water effectively.

SUMMARY OF THE INVENTION

It is therefore the primary objective of the present invention to provide an improved sand filter capable of effective removal of the impurities contained in the water.

In keeping with the principle of the present invention, the foregoing objective of the present invention is attained by a continuous sand filter, which is composed of a first separation tank and a second separation tank. The continuous filtration of the waste water is carried out by the first separation tank and the second separation tank. The first separation tank is provided with an arresting piece capable of enhancing the filtration effect. The light and the heavy impurities are treated separately in the first separation tank. The further filtration process is carried out continuously in the second separation tank.

The foregoing objective, features, functions, and advantages of the present invention will be more readily understood upon a thoughtful deliberation of the following detailed description of a preferred embodiment of the present invention in conjunction with the accompanying drawings.

DETAILED DESCRIPTION OF THE EMBODIMENT

Figure 1:
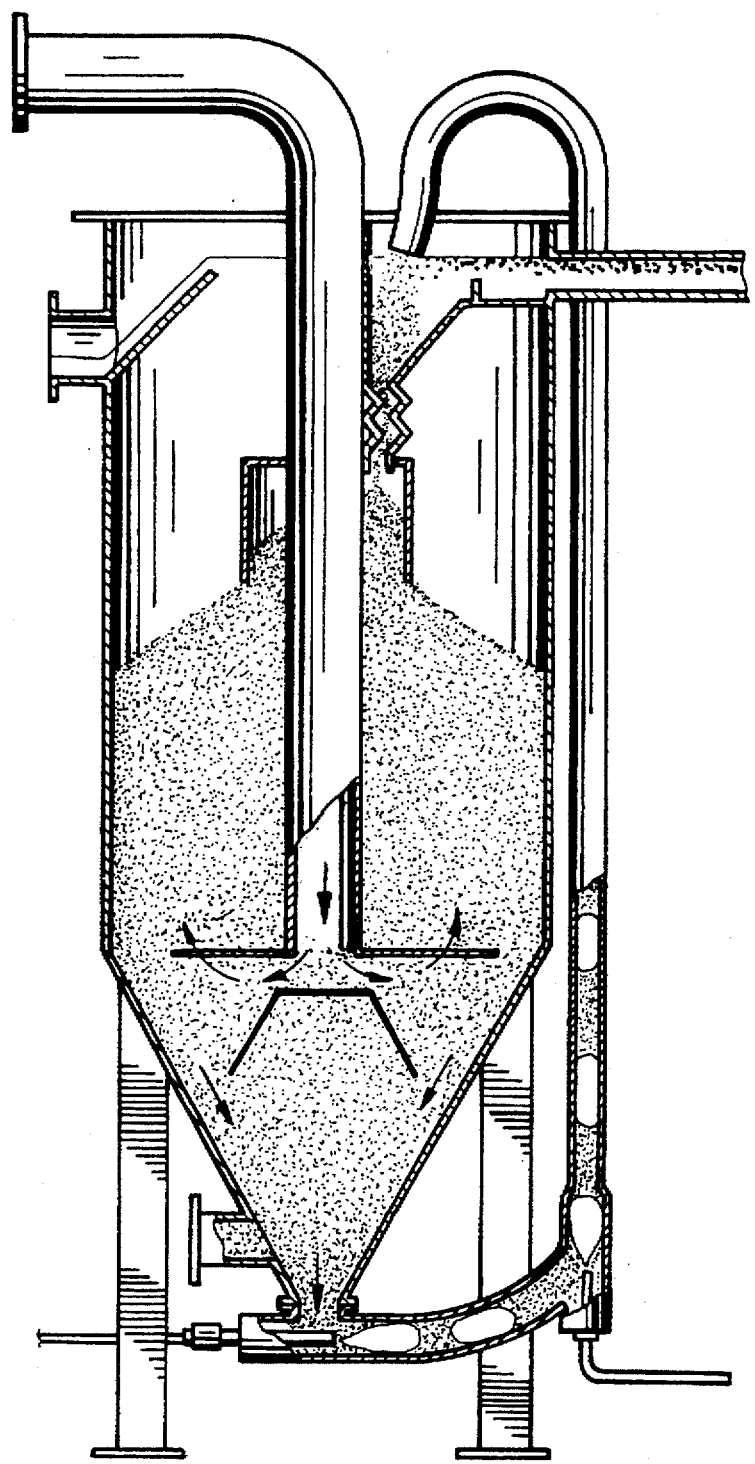
FIG. 1 shows a sectional schematic view of a sand filter of the prior art.
Figure 2:
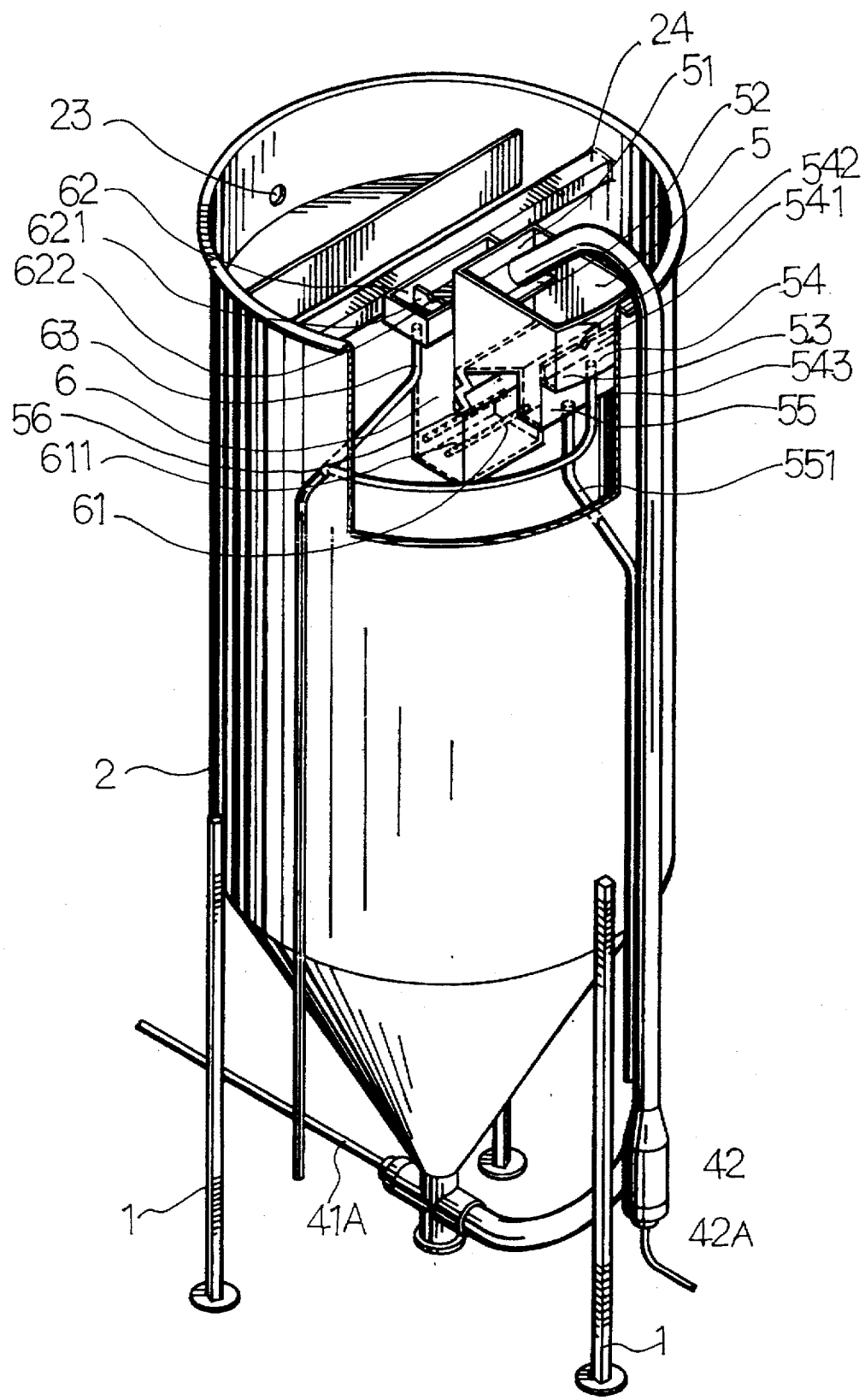
FIG. 2 shows a perspective view of a sand filter of the present invention.
Figure 3:
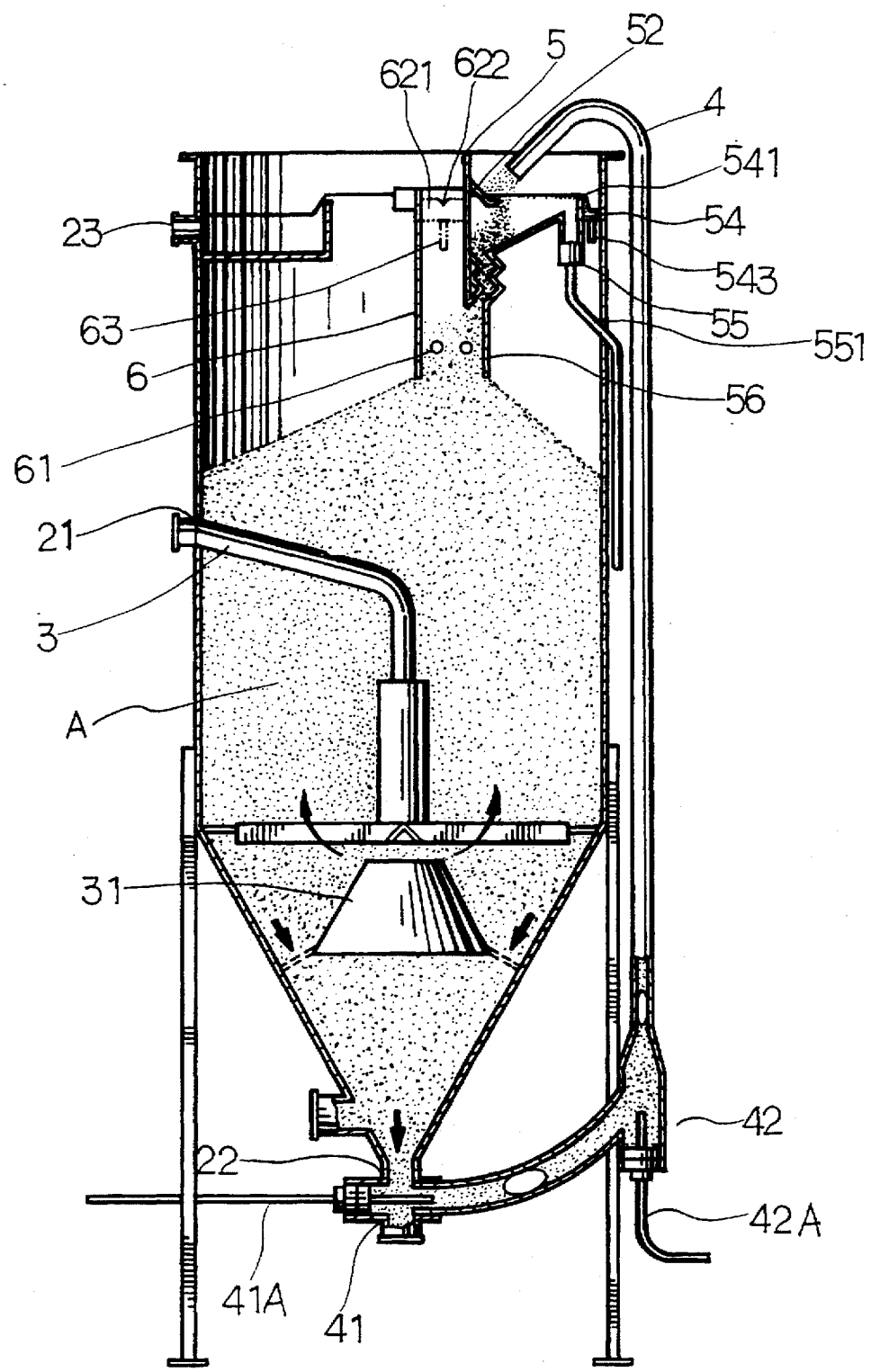
FIG. 3 shows a sectional schematic view of the present invention.
Figure 4:
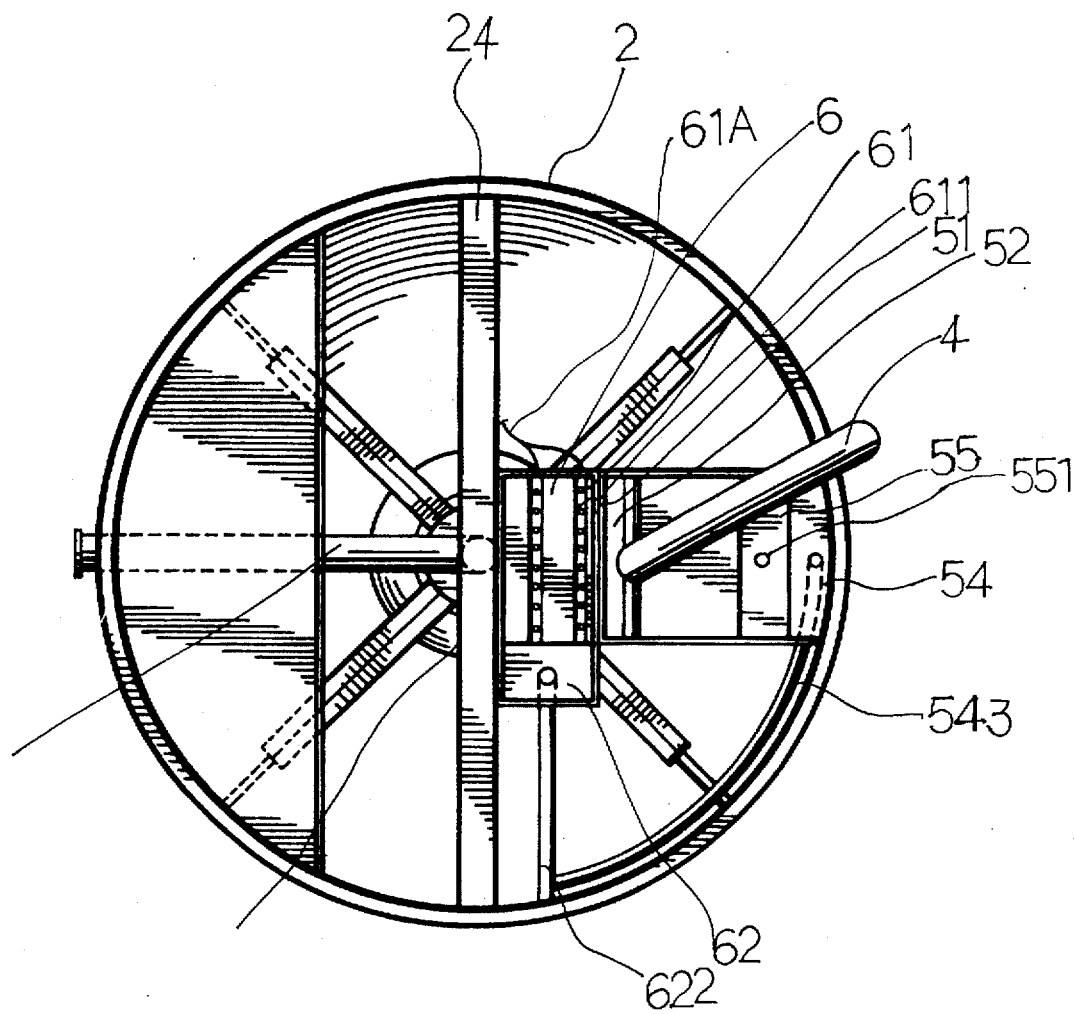
FIG. 4 shows a top schematic view of the present invention.

As illustrated in FIGS. 2, 3 and 4, a sand filter embodied in the present invention is composed of a tank 2 which is mounted on a plurality of support legs 1 and is provided with an inlet 21 and a water-admitting pipe 3 in communication with the inlet 21. Located under the inner end of the water-admitting pipe 3 is a buffer platform 31. The tank 2 is gradually tapered toward the bottom end thereof and is provided at the bottom end thereof with an outlet 22 in communication with a sand pipe 4. The tank 2 contains a predetermined amount of filtration sand A. The tank 2 is provided at the top end thereof with a clean water discharging port 23. An air pressure tube 41A of an air compressor (not shown in the drawings) is mounted at an input end 41 of the sand pipe 4. Another air pressure tube 42A of the air compressor is connected with a fork tube 42. The filtration sand A containing the impurities is transported to a first separation tank 5 by the compressed air via the air pressure tubes 41A and 42A.

As shown in FIG. 2, the first separation tank 5 has an arresting piece 52 extending from a side wall 51 facing the outlet of the sand pipe 4. Located at the bottom of another side wall 53 of the first separation tank 5 is a shallow furrow 54 having in the inner wall thereof a separation surface 541 provided with an indentation 542. The shallow furrow 54 is connected with an output tube 543. The shallow furrow 54 is provided integrally with a deep furrow 55 which is connected with another output tube 551. The side wall 51 is provided at the bottom with an outlet 56 in communication with a second separation tank 6 fastened with a support rod 24.

The second separation tank 6 is located over the filtration sand A and is provided with two tubular bodies 61 having a plurality of pores 611. The tubular bodies 61 are intended for the control of the air admission via an air pressure tube 61A. The second separation tank 6 is provided with a tank body 62 extending from the upper side of the second separation tank 6 such that the bottom of the tank body 62 is connected with an output tube 63. The tank body 62 has a separation surface 621 provided with an indentation 622.

As shown in FIGS. 2 and 3, the waste water is injected into the filtration sand A in the tank 2 via the water-admitting pipe 3 such that the waste water is filtered by the filtration sand A, and that the clean water is discharged via the clean water discharging port 23. The tank 2 is in communication with the sand pipe 4. The filtration sand A containing the impurities is transported via the sand pipe 4 by the compressed air through the air pressure pipes 41A and 42A to the first separation tank 5 in which the filtration sand A is dispersed by the arresting piece 52 so as to separate the light impurities from the heavy impurities. The light impurities are then discharged from the output tube 543 of the shallow furrow 54 via the indentation 542 of the separation surface 541 of the shallow furrow 54. In the meantime, the heavy impurities are discharged from the output tube 551 of the deep furrow 55. The filtration sand A is allowed to move from the first separation tank 5 into the second separation tank 6 via the outlet 56 of the first separation tank 5. The compressed air is then introduced into the second separation tank 6 via the pores of the tubular bodies 61 by the air pressure tube 61A, thereby resulting in the dispersion of the filtration sand A by the compressed air. The impurities contained in the filtration sand A are therefore separated from the filtration sand A. The separated impurities are discharged from the output tubes 543 and 63 via the tank body 62.

The first separation tank 5 of the present invention is provided with the arresting piece 52 for reducing the impulse of ejecting the filtration sand from the sand pipe so as to prevent the impurities from moving out of the first separation tank 5. The filtration process is further carried out in the second separation tank 6 into which the compressed air is introduced via the pores 611 of the tubular bodies 61 in conjunction with the air pressure tube 61A. The filtration sand is once again dispersed by the compressed air in the second separation tank 6 such that the impurities are separated from the filtration sand.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A continuous sand filter comprising a tank mounted on a plurality of support rods and provided with an inlet and an outlet, said inlet being provided with a water admitting pipe under which a buffer platform is located, said tank being tapered in shape and connected with a sand pipe connected with air tubes of an air compressor; wherein said tank is provided therein with a first separation container comprising an arresting piece extending from a side wall of said first separation container, said first separation container farther comprising a shallow furrow which is provided in a separation surface of an inner wall thereof with an indentation and is connected with an output tube, said shallow furrow provided integrally with a deep furrow connected with an output tube; and wherein said tank is further provided therein with a second separation container located over filtration sand contained in said tank and provided with two tubular bodies having pores for introducing compressed air into said second separation container from an air pressure tube of said air compressor, said second separation container further provided with a tank body extending from said second separation container such that said tank body is connected with an output tube, and that said tank body has a separation surface provided with an indentation.

* * * * *